(12) United States Patent
Wooldridge et al.

(10) Patent No.: US 9,611,792 B2
(45) Date of Patent: Apr. 4, 2017

(54) METHOD AND SYSTEM FOR IMPROVED DILUTION TOLERANCE

(71) Applicant: Ford Global Technologies, LLC, Dearborn, MI (US)

(72) Inventors: Steven Wooldridge, Saline, MI (US); Gopichandra Surnilla, West Bloomfield, MI (US); Jianwen James Yi, West Bloomfiled, MI (US); Brad Alan Boyer, Canton, MI (US); James Alfred Hilditch, Canton, MI (US); Michael Howard Shelby, Plymouth, MI (US); Benjamin Richard Petersen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/151,337

(22) Filed: May 10, 2016

(65) Prior Publication Data

US 2016/0252026 A1    Sep. 1, 2016

Related U.S. Application Data

(62) Division of application No. 13/975,068, filed on Aug. 23, 2013, now Pat. No. 9,334,826.

(51) Int. Cl.
| | | |
|---|---|---|
| F02M 25/07 | (2006.01) |
| F02D 41/00 | (2006.01) |
| F02D 43/00 | (2006.01) |
| F02D 41/10 | (2006.01) |
| F02D 41/14 | (2006.01) |
| F02D 41/40 | (2006.01) |
| F02D 35/02 | (2006.01) |
| F02M 26/06 | (2016.01) |
| F02D 41/04 | (2006.01) |

(52) U.S. Cl.
CPC ......... *F02D 41/005* (2013.01); *F02D 35/027* (2013.01); *F02D 41/0007* (2013.01); *F02D 41/107* (2013.01); *F02D 41/1498* (2013.01); *F02D 41/402* (2013.01); *F02D 43/00* (2013.01); *F02M 26/06* (2016.02); *F02D 41/0005* (2013.01); *F02D 41/045* (2013.01); *F02D 2200/602* (2013.01); *Y02T 10/44* (2013.01); *Y02T 10/47* (2013.01)

(58) Field of Classification Search
CPC .... F02D 41/005; F02D 41/402; F02D 41/403; F02D 41/405
USPC ........... 123/568.11, 568.14, 568.21, 568.23, 123/568.26, 304, 525
See application file for complete search history.

(56) References Cited

U.S. PATENT DOCUMENTS

| | | |
|---|---|---|
| 6,014,959 A | 1/2000 | Ma |
| 6,026,780 A | 2/2000 | Barnes et al. |
| 9,284,909 B2 | 3/2016 | Wooldridge et al. |
| 9,382,854 B2 | 7/2016 | Leone |

(Continued)

*Primary Examiner* — John Kwon

(74) *Attorney, Agent, or Firm* — Julia Voutyras; McCoy Russell LLP

(57) ABSTRACT

Methods and systems are provided for improving combustion stability, in particular during transient operations such as tip-out to lower load conditions, when EGR is being purged. Until a desired LP-EGR rate is achieved, fuel may be delivered as a split injection with at least an intake stroke injection and a compression stroke injection. Subsequently, single fuel injection may be resumed.

7 Claims, 10 Drawing Sheets

(56) References Cited

U.S. PATENT DOCUMENTS

| | | |
|---|---|---|
| 2006/0196469 A1 | 9/2006 | Kuo et al. |
| 2011/0174263 A1 | 7/2011 | Leone et al. |
| 2011/0174267 A1 | 7/2011 | Surnilla et al. |
| 2011/0174268 A1 | 7/2011 | Surnilla et al. |
| 2012/0024262 A1 | 2/2012 | Leone |
| 2012/0029795 A1 | 2/2012 | Surnilla et al. |
| 2013/0125544 A1 | 5/2013 | Mond et al. |
| 2015/0053177 A1* | 2/2015 | Wooldridge ............ F02D 43/00 123/406.3 |
| 2015/0057911 A1* | 2/2015 | Wooldridge ............ F02D 43/00 701/108 |

* cited by examiner

METHOD AND SYSTEM FOR IMPROVED DILUTION TOLERANCE

CROSS REFERENCE TO RELATED APPLICATIONS

The present application is a divisional of U.S. patent application Ser. No. 13/975,068, "METHOD AND SYSTEM FOR IMPROVED DILUTION TOLERANCE," filed on Aug. 23, 2013, now U.S. Pat. No. 9,334,826, the entire contents of which are hereby incorporated by reference for all purposes.

TECHNICAL FIELD

The present application relates to methods and systems for improving exhaust gas recirculation dilution tolerance of an engine during operation at light loads.

BACKGROUND AND SUMMARY

Exhaust gas recirculation (EGR) systems recirculate a portion of exhaust gas from an engine exhaust to an engine intake system to improve fuel economy and vehicle emissions by reducing throttling losses and combustion temperatures. In turbo-charged direct injection engines, a low-pressure EGR (LP-EGR) circuit may be implemented. The LP-EGR circuit recirculates exhaust gases from an exhaust passage downstream of a turbine to an intake passage upstream of a turbocharger compressor. In order to provide EGR over a wide-range of operating conditions, LP-EGR systems may utilize a flat EGR schedule wherein a fixed EGR percentage of fresh airflow may be maintained.

One example approach for providing desired EGR dilution is shown by Ma et. al in U.S. Pat. No. 6,014,959. Therein, a rigid connection is provided between an EGR throttle and a main air intake throttle, linking movement of the EGR throttle as a function of the movement of the main throttle such that EGR dilution is always in a fixed proportion to the intake air flow.

However the inventors herein have identified potential issues with such an approach. Delivering EGR as per Ma may lead to combustion instability and engine misfire events during transient operations due to excess EGR dilution. Particularly, in turbo-charged systems, providing EGR though the LP-EGR circuit may cause long transport delays, as the exhaust gases have to travel though the turbocharger compressor, high-pressure air induction plumbing, charge air cooler, and intake manifold before reaching the combustion chamber. During selected transient operations, such as during a tip-out operation where the engine goes from a high load and high EGR rate condition to a low load and low EGR rate condition, EGR may need to be rapidly reduced. However EGR may not be purged from the intake manifold as rapidly as required. As a result, there may be elevated intake-air EGR dilution during the low load condition until the EGR is purged from the air intake system. The presence of increased intake-air dilution at low loads can increase combustion stability issues and the propensity for engine misfires.

In one example, some of the above issues can be at least partly addressed by a method for an engine comprising: in response to decreasing load while operating an engine with EGR, decreasing EGR, and fueling the engine with split fuel injection per cycle until EGR is less than a threshold. In this way, the EGR tolerance of the engine at low loads is improved.

As an example, an engine system may be configured with a low pressure EGR (LP-EGR) system to recirculate a portion of exhaust gas from an exhaust manifold, downstream of an exhaust turbine, to an intake manifold, upstream of an intake compressor via an EGR valve. The exhaust gas may be cooled upon passage through an EGR cooler before being delivered to the intake. Based on engine operating conditions, such as engine speed-load conditions, EGR delivery may be adjusted.

During a transition from operating the engine at a higher load to very low loads, such as during a tip-out operation, the throttle may be closed to reduce airflow and the EGR valve may also be correspondingly closed (or an opening reduced) to provide lower EGR at the lower loads. As such, at the low load conditions, engine dilution may not be required. However, the purging of the EGR may occur slower than desired due to transport delays in the LP-EGR system. The presence of more dilution than required can degrade combustion stability and induce misfires. In order to improve the low load engine combustion stability and EGR tolerance, while EGR is purged from the intake system, the engine may be transiently operated with split fuel injection. Specifically, until EGR reaches a desired rate (e.g., a zero EGR condition), fuel may be delivered as a first lean homogenous intake stroke injection and a second locally rich stratified compression stroke injection, while maintaining overall combustion air-fuel ratio at stoichiometry. Then, when the EGR has been purged and the desired EGR rate reached, single fuel injection may be resumed.

In this way, by temporarily performing a split fuel injection when operating the engine at low loads in the presence of more EGR dilution than required, the EGR tolerance of the engine may be improved. By delivering a larger portion of the fuel during the intake stroke and the remaining fuel during the compression stroke around the spark event, a rich air-fuel mixture may be created around the spark plug which expedites the burn time of the mixture. In addition, the split injection enables a later spark timing to be utilized in which further improves combustion stability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
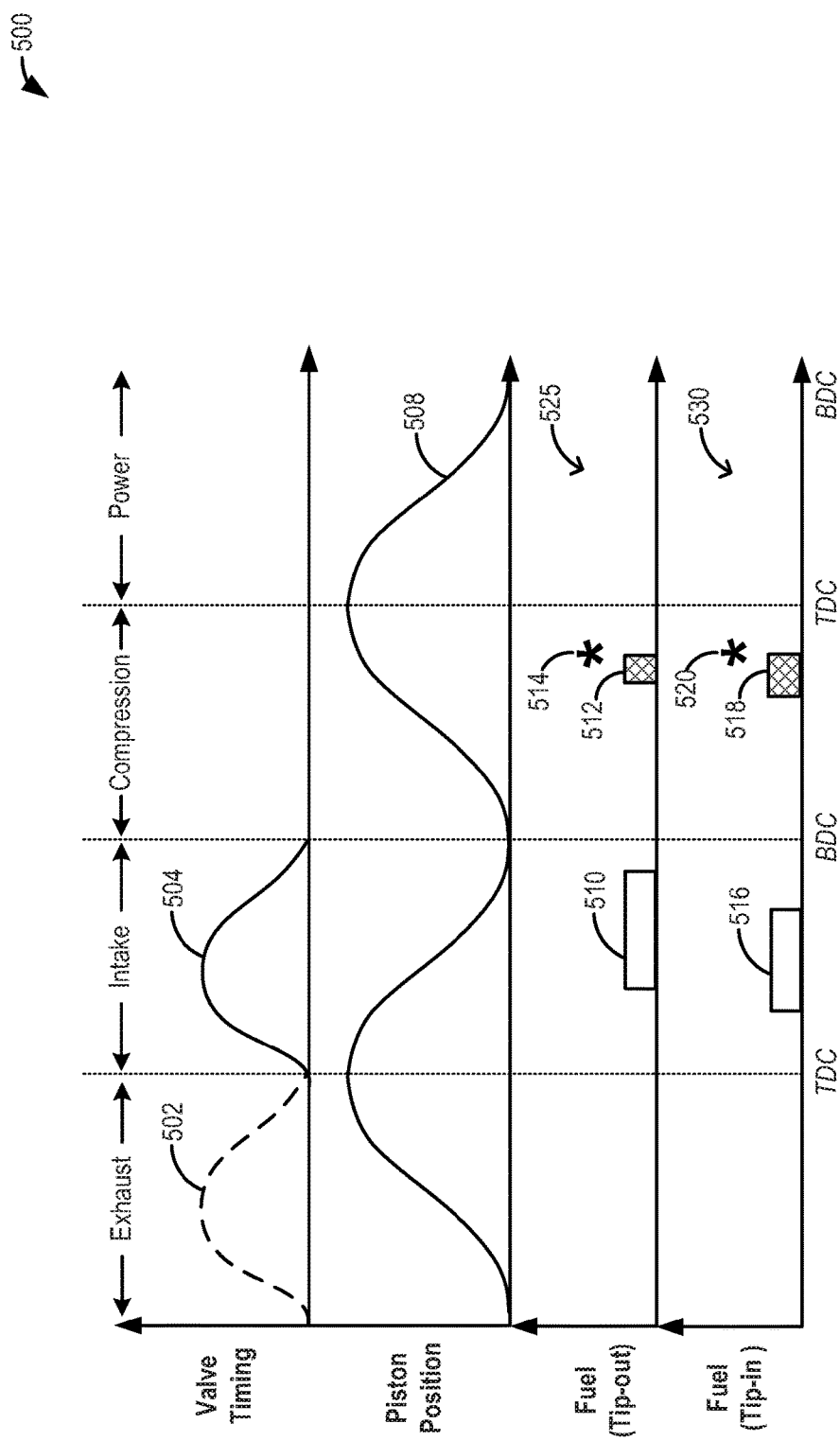
FIG. 5 shows example split ratios and injection timings for the split fuel injections of FIGS. 3-4.
Figure 6:
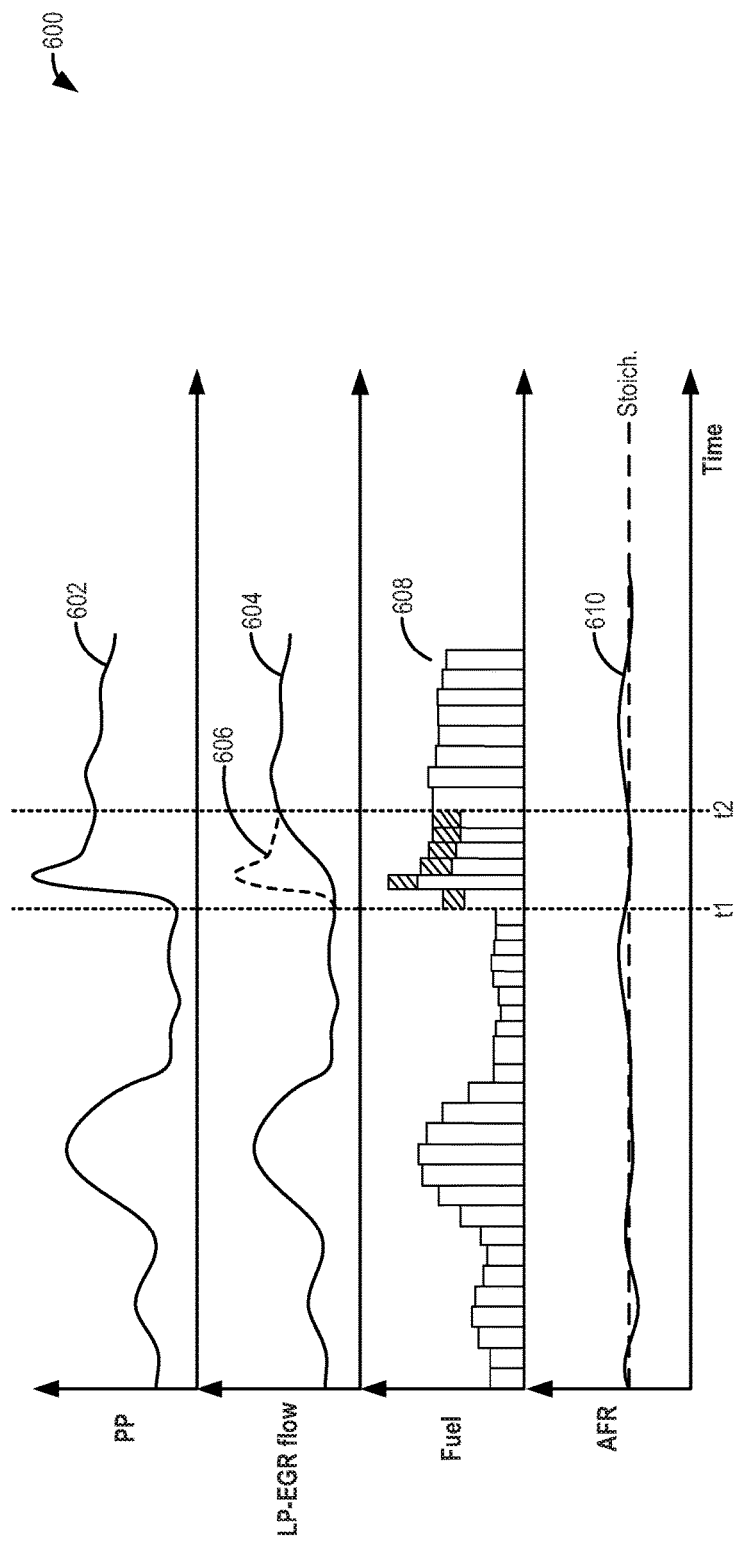
FIG. 6 depicts an example split fuel injection used during a tip-in, according to the present disclosure.
Figure 7:
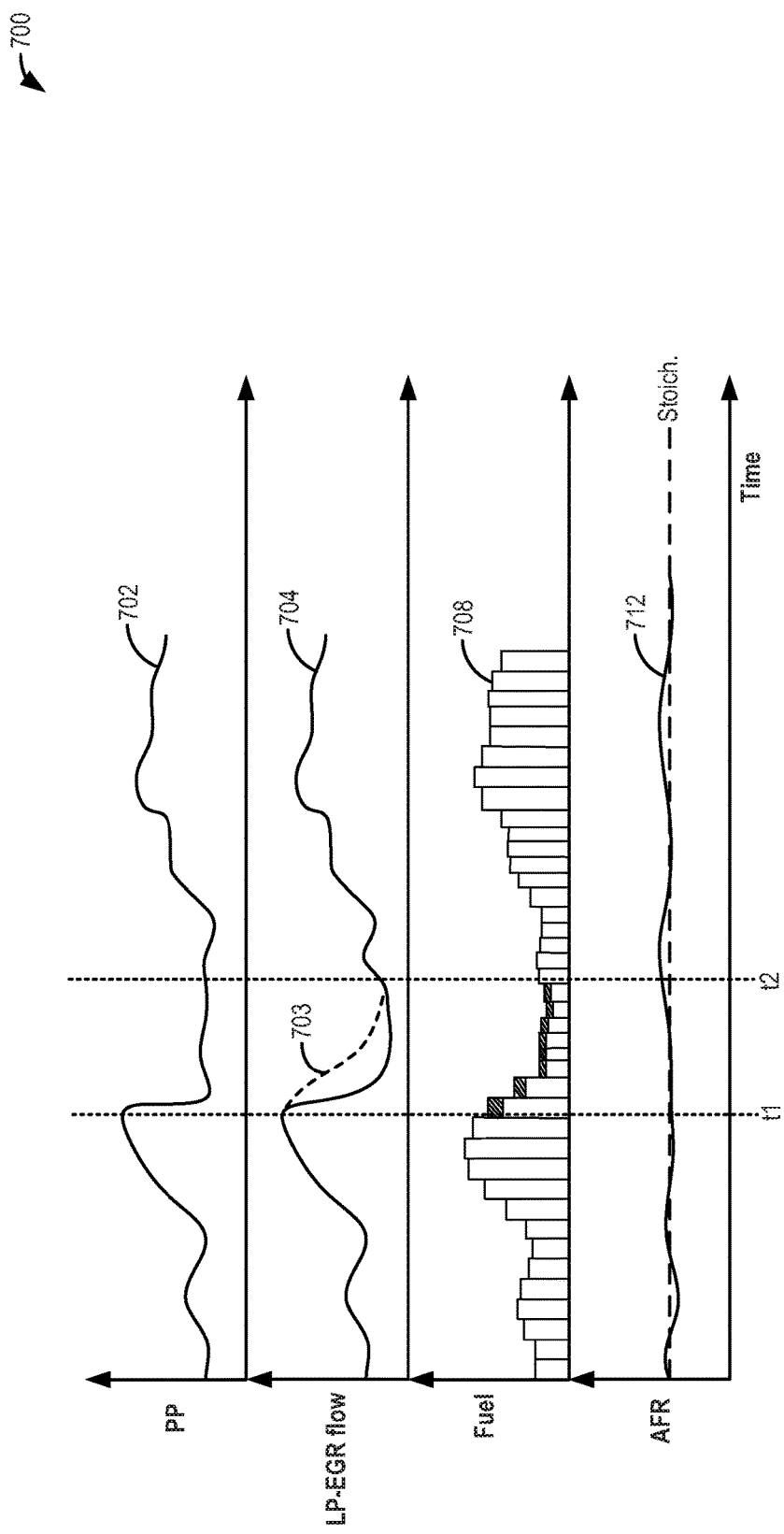
FIG. 7 depicts an example split fuel injection used during a tip-out, according to the present disclosure.
Figure 8:
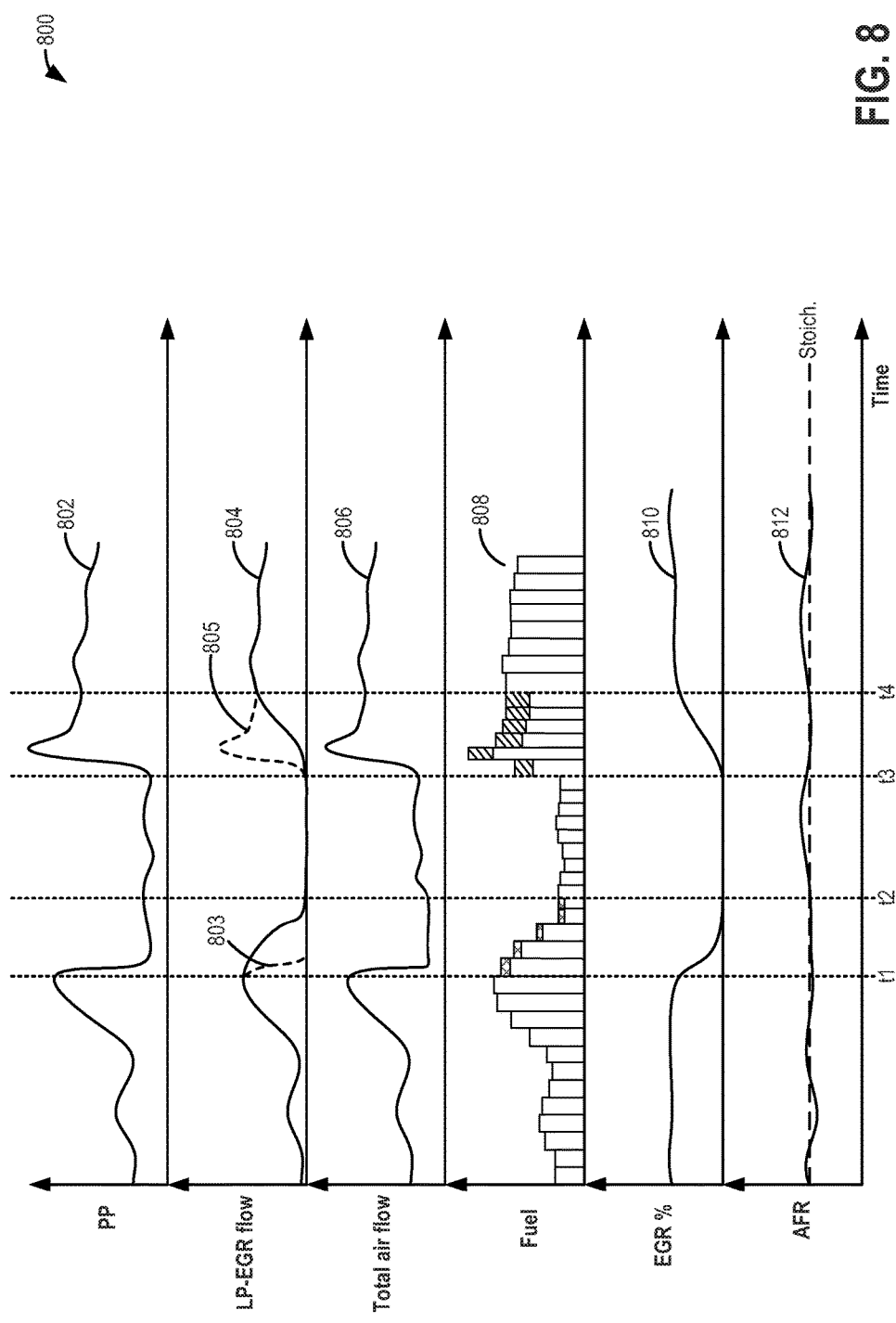
FIGS. 8 and 10 show example maps depicting ramping in and out of LP-EGR while using split fuel injection to improve knock and EGR tolerance, according to the present disclosure.
Figure 10:
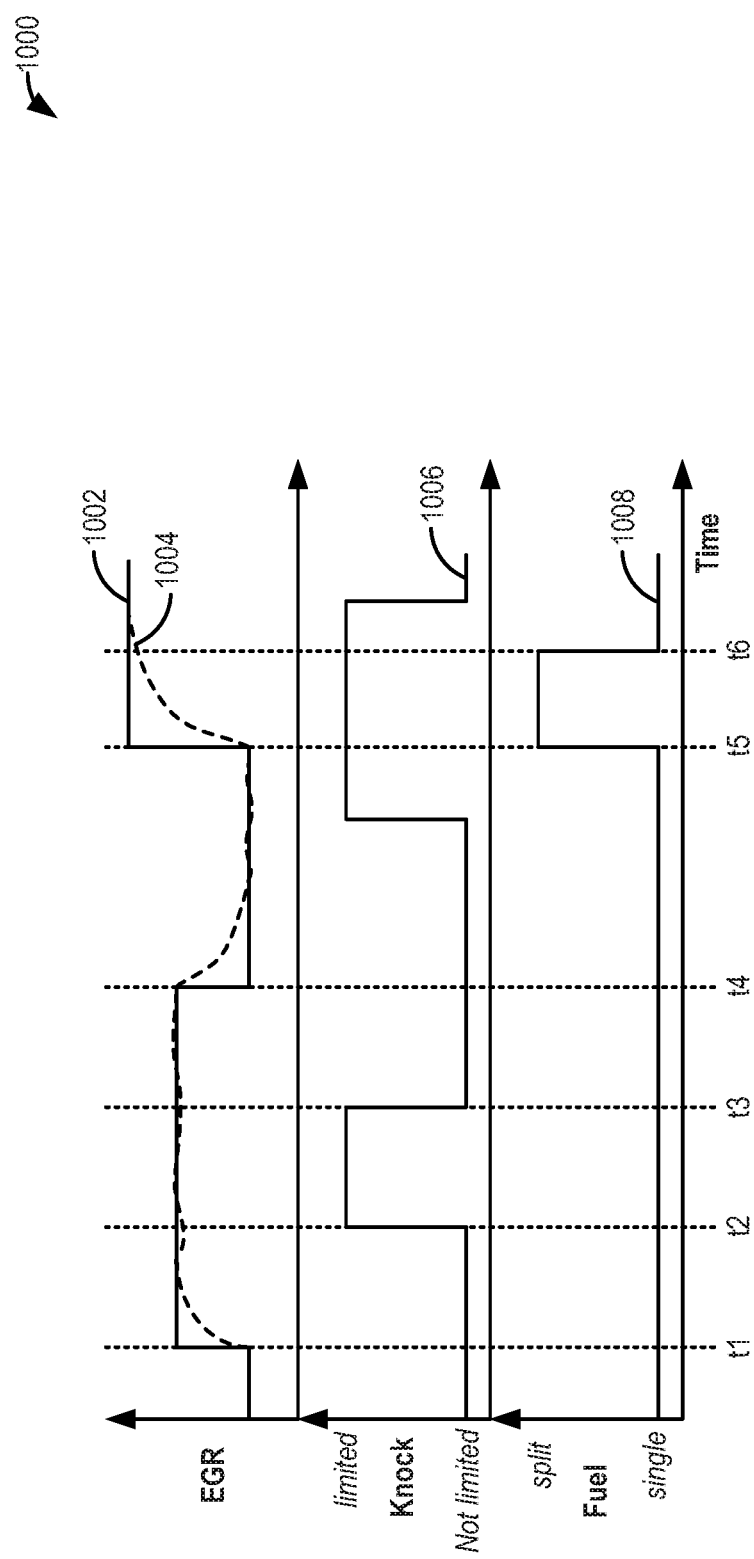

The present description relates to an EGR system coupled to a turbocharged engine in a motor vehicle. In one non-limiting example, the engine may be configured as part of the system illustrated in FIG. 1, wherein the engine includes at least one cylinder, a control system, a turbocharger, and an exhaust gas recirculation system, among other features. An engine controller may be configured to perform a control routine, such as the routine of FIGS. 2-4, to transiently shift to split fuel injection while ramping in LP-EGR to mitigate knock issues arising from delayed EGR delivery and transiently shift to split fuel injection while ramping out LP-EGR to improve engine dilution tolerance. The split fuel injection may include at least an intake stroke injection and a compression stroke injection, as depicted at FIGS. 5-7. Example engine adjustments during the ramping in or ramping out of the LP-EGR are shown at FIGS. 8 and 10. In this way, engine operation with EGR can be improved.

Figure 1:
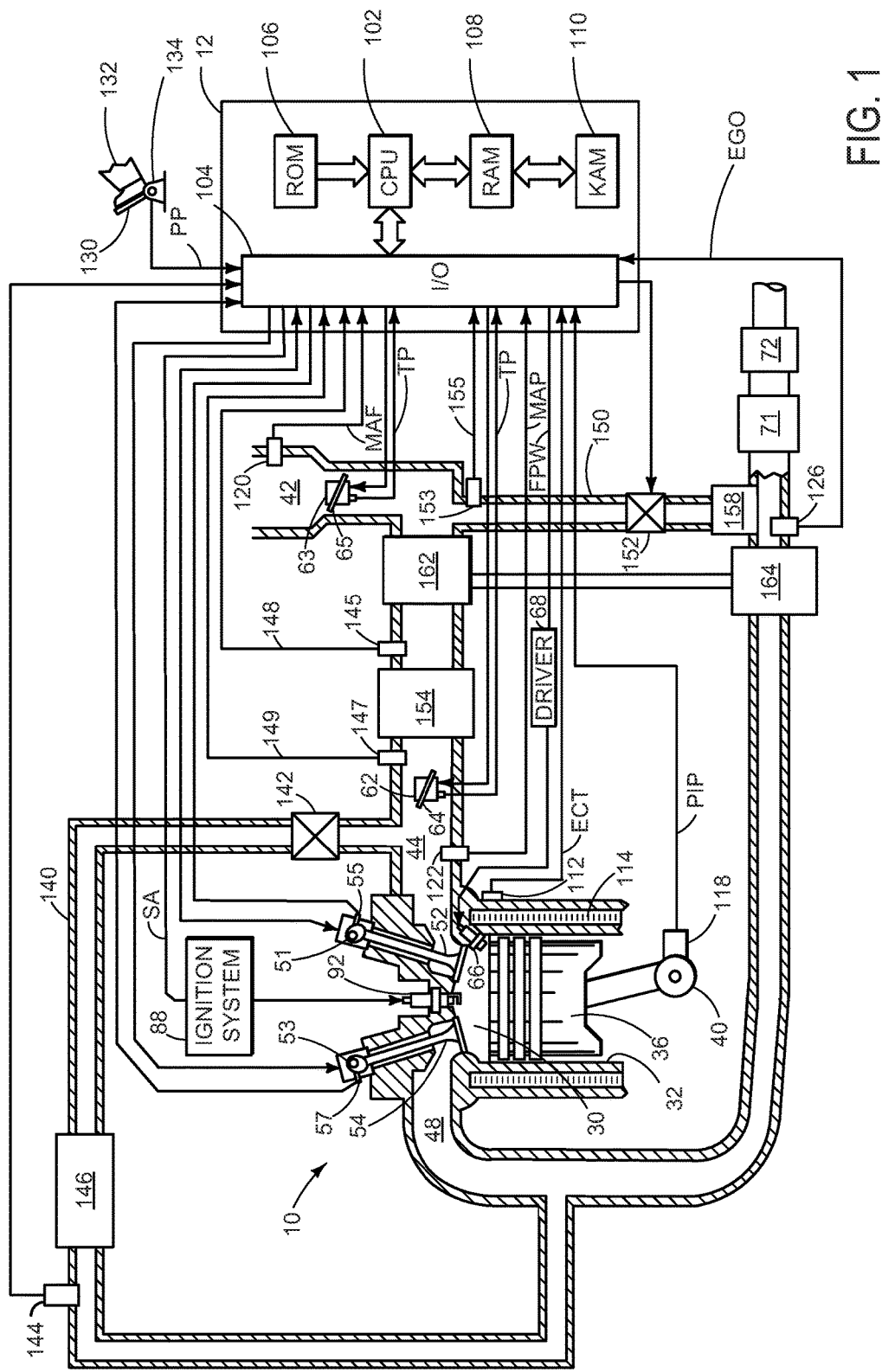
FIG. 1 shows a schematic diagram of an embodiment of an engine with a turbocharger and an exhaust gas recirculation system.

FIG. 1 shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via intake cam 51. Similarly, exhaust valve 54 may be controlled by controller 12 via exhaust cam 53. Alternatively, the variable valve actuator may be electric, electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an exhaust gas recirculation (EGR) system may route a desired portion of exhaust gas from exhaust passage 48 to intake manifold 44. FIG. 1 shows a high pressure EGR (HP-EGR) system and a low pressure EGR (LP-EGR) system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Thus, engine 10 may comprise both an HP-EGR and an LP-EGR system to route exhaust gases back to the intake. In some embodiments, the LP-EGR system may be controlled to operate under various modes based on engine operating parameters. In some embodiments, the LP-EGR modes may be determined by a speed-load table stored in the memory of controller 12. One example engine speed-load map depicting two LP-EGR operating modes, fixed and variable, is shown at map 900 in FIG. 9. As a special case, the LP-EGR system may be operated in a fixed or lower EGR rate mode wherein LP-EGR is provided at a fixed EGR percentage rate of fresh airflow from mid-load down to a minimum engine load, even as load, and thus airflow or air charge, changes. Above the mid-load region, the LP-EGR system may be operated in variable or higher EGR rate mode wherein the LP-EGR rate is constantly changed relative to the air. In the fixed mode, the LP-EGR circuit may have a fixed EGR percentage rate of fresh airflow across an area of the speed/load map, including a minimum engine load corresponding to closed throttle (e.g., due to drive pedal tip-outs). For example, when air flow reduces at minimum engine load conditions, or engine idling conditions, LP-EGR may be correspondingly reduced to substantially zero EGR conditions. During the zero % EGR conditions, no exhaust gas recirculation is provided from downstream of the turbine to upstream of the compressor via the LP-EGR system. In one embodiment, a constant percent of LP-EGR may be provided in the areas most likely to experience problematic transient control of LP-EGR, such as the minimum load encountered during a driver pedal tip-out event.

The use of a fixed EGR rate at the specified engine speed-load conditions may provide several advantages. Because transient control issues may reduce the areas of the speed-load map under which EGR may be utilized effectively, improving transient control may extend the use of EGR under more operating conditions, reducing throttling losses and improving fuel economy. Further, EGR lowers peak cylinder temperatures, reducing the production of NOx. Thus, extending the use of EGR into more areas of the speed-load map may reduce engine-out emissions. Also, operating the LP-EGR circuit with a fixed percentage rate of fresh airflow may improve component durability. For example, not turning LP-EGR on and off during tip-outs and tip-ins reduces the number of thermal cycles on the EGR cooler, improving its durability. Additionally, the number of closing events of the EGR valve may be reduced, improving valve durability. Next, EGR mixing may be improved, as running a consistent LP-EGR amount can allow for optimized sizing of the EGR and air flow ducts to create even dispersion of the EGR into the air. Finally, running fixed LP-EGR may reduce the dynamic range requirements for the EGR valve and sensors and simplify the control strategy for the EGR throttle, reducing system costs and complexity.

As elaborated herein, during the delivery of EGR, there may be conditions where there is an EGR error. Specifically, the EGR error may reflect a difference between the desired or target EGR and the actually delivered EGR. As such, the EGR error can occur during conditions of increasing engine load when EGR needs to be rapidly increased and/or during conditions of decreasing engine load when EGR needs to be rapidly decreased. If there is an EGR error during increasing engine load, the engine may, at least temporarily, have less dilution than required and may enter a knock-limited operating region (e.g., where the engine is operating at or beyond the knock limit). Likewise, if there is an EGR error during decreasing engine load, the engine may, at least temporarily, have more dilution than required and may enter a combustion stability limited operating region (e.g., where the engine is operating at or beyond the combustion stability limit). In either case, engine knock tolerance and dilution tolerance can be improved by transitioning from a single fuel injection to a split fuel injection, as elaborated below.

Figure 2:
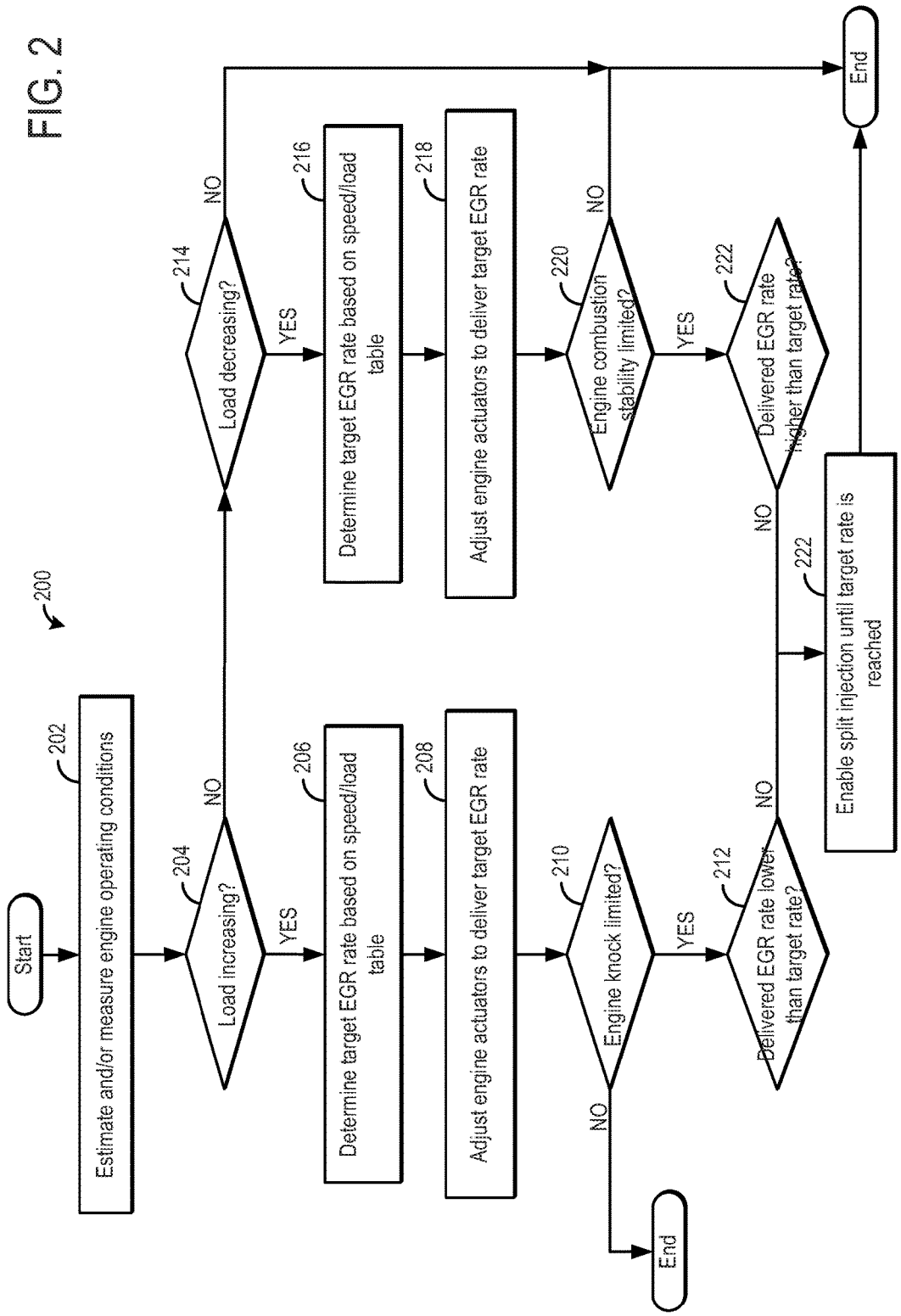
FIG. 2 shows a high level flow chart for operating the exhaust gas recirculation system of FIG. 1 with split fuel injection during conditions when knock or combustion stability is limited.

Turning now to method 200 of FIG. 2, it depicts a method for operating a low pressure EGR system using split injection during conditions when EGR delivery (or removal) is delayed and the engine becomes temporarily knock or combustion stability limited. Method 200 may be carried out by controller 12.

Method 200 comprises, at 202, determining engine operating conditions. Engine operating conditions such as engine speed, engine load, vehicle speed, barometric pressure (BP), manifold pressure (MAP), engine temperature, etc., may be measured and/or estimated from sensors including throttle position sensor, pedal position sensor, etc.

At 204, it may be determined if the engine load is increasing. In one example, the load may be increasing responsive to a driver pedal tip-in. If the engine load is increasing, at 206, a target EGR rate may be determined based on the engine operating conditions and the increasing load. At 208, one or more engine actuators may be adjusted based on the target EGR rate. For example, in response to the increasing load, a target EGR rate may be increased and an EGR valve opening may be increased to provide the target rate.

However, due to delays in EGR delivery, the engine may become temporarily knock limited. The delay in EGR delivery may be due to the length of the EGR passage. At 210, it may be determined if the engine is knock limited. For example, it may be determined if the engine is currently knock limited with single fuel injection. As a further example, it may be determined if the engine is operating at or beyond a knock limit. If confirmed, at 212 it may be determined if the delivered EGR rate is lower than the target EGR rate required. If yes, at 214, the routine includes using split fuel injection until the EGR rate is at the target rate. Then, once the required engine dilution is achieved and the engine is not knock-limited, single fuel injection may be resumed.

Returning to 204, if the engine load is not increasing, at 214, it may be determined if the engine load is decreasing. In one example, the load may be decreasing responsive to a driver pedal tip-out. If the engine load is decreasing, then at 216, a target EGR rate may be determined based on the engine operating conditions and the decreasing load. At 218, one or more engine actuators may be adjusted based on the target EGR rate. For example, in response to the decreasing load, a target EGR rate may be decreased and an EGR valve opening may be decreased to provide the target rate.

However, due to delays in EGR purging, the engine may become temporarily combustion stability limited. Delays in EGR purging may be due to the length of the passage causing a time delay since the closing of the EGR valve. At 220, it may be determined if the engine is combustion stability limited. For example, it may be determined if the engine is operating at or beyond a combustion stability limit. If yes, at 222 it may be determined if the delivered EGR rate is higher than the target EGR rate required. If yes, at 224, the routine includes using split fuel injection until the EGR rate is at the target rate. Then, once the required engine dilution is achieved and the engine is not combustion stability-limited, single fuel injection may be resumed.

In this way, split fuel injection may be advantageously used to improve engine knock and dilution tolerance in the event of EGR rate delivery errors and delays. As such, the delay and error may be due to controls, or actuators, etc. By using a split injection when the delivered EGR rate is above a threshold for stable combustion, dilution tolerance of the engine is improved. Example conditions where split injection can be used to improve dilution tolerance include a tip-out from high load and high EGR rate conditions to lower load and low EGR rate conditions. Likewise, split fuel injection can be advantageously used to improve engine knock tolerance during any maneuver that transitions the engine into a knock-limited regime where the delivered EGR rate is less than the EGR rate desired for knock mitigation. As such, EGR delivery error may be due to controls, or actuators, etc. Example conditions where split injection can be used to improve knock tolerance include a tip-in from low load and low EGR rate conditions to higher load and higher EGR rate conditions, as well as a tip-in from a high load and low EGR rate condition to high load and high EGR rate conditions.

In one example, in response to an EGR error being higher than a threshold while the engine is knock limited, a controller may improve knock tolerance and dilution tolerance by transitioning into split fuel injection. The controller may maintain usage of a split injection until either the EGR error is lower than the threshold (e.g., the delivered EGR is within a threshold of the target EGR) or the engine moves out of a knock-limited regime (if the EGR error occurred when the engine was knock-limited) or a combustion stability limited regime (if the EGR error occurred when the engine was combustion stability limited). The EGR error includes a difference between the delivered EGR and a target EGR, the target EGR based on engine speed-load conditions (e.g. a final lower load requested during a tip-out or a final higher load requested during a tip-in).

The controller may be configured to operate the engine in one or more modes to improve the knock tolerance of the engine. For example, during a first mode, in response to an EGR error being higher than a threshold and the engine operating in a knock-limited region, the controller may maintain single fuel injection and retard spark timing. In comparison, during a second mode, in response to the EGR error being higher than the threshold and the engine operating in the knock-limited region, the controller may transition to split fuel injection. By transitioning to a split fuel injection, the amount of spark retard required to mitigate the knock may be reduced, providing fuel economy benefits. For example, retarding spark timing during the first mode may include retarding spark timing by a first amount, and the controller may, during the second mode, retard spark timing by a second amount, wherein the second amount is smaller than the first amount. In one example, no spark retard may be required during the second mode when split fuel injection is used to address the knock. For example, ignition timing may be maintained during the second mode. In addition, the use of a split injection can also reduce the propensity for pre-ignition and misfires.

Likewise, in response to an EGR error being higher than a threshold while the engine is combustion stability limited, the controller may transition into split fuel injection. The split injection may then be maintained until the EGR error is lower than the threshold or the engine moves out of a combustion stability limited regime. Herein also, the EGR error includes a difference between a delivered EGR and a target EGR, the target EGR based on engine speed-load conditions.

Figure 3:
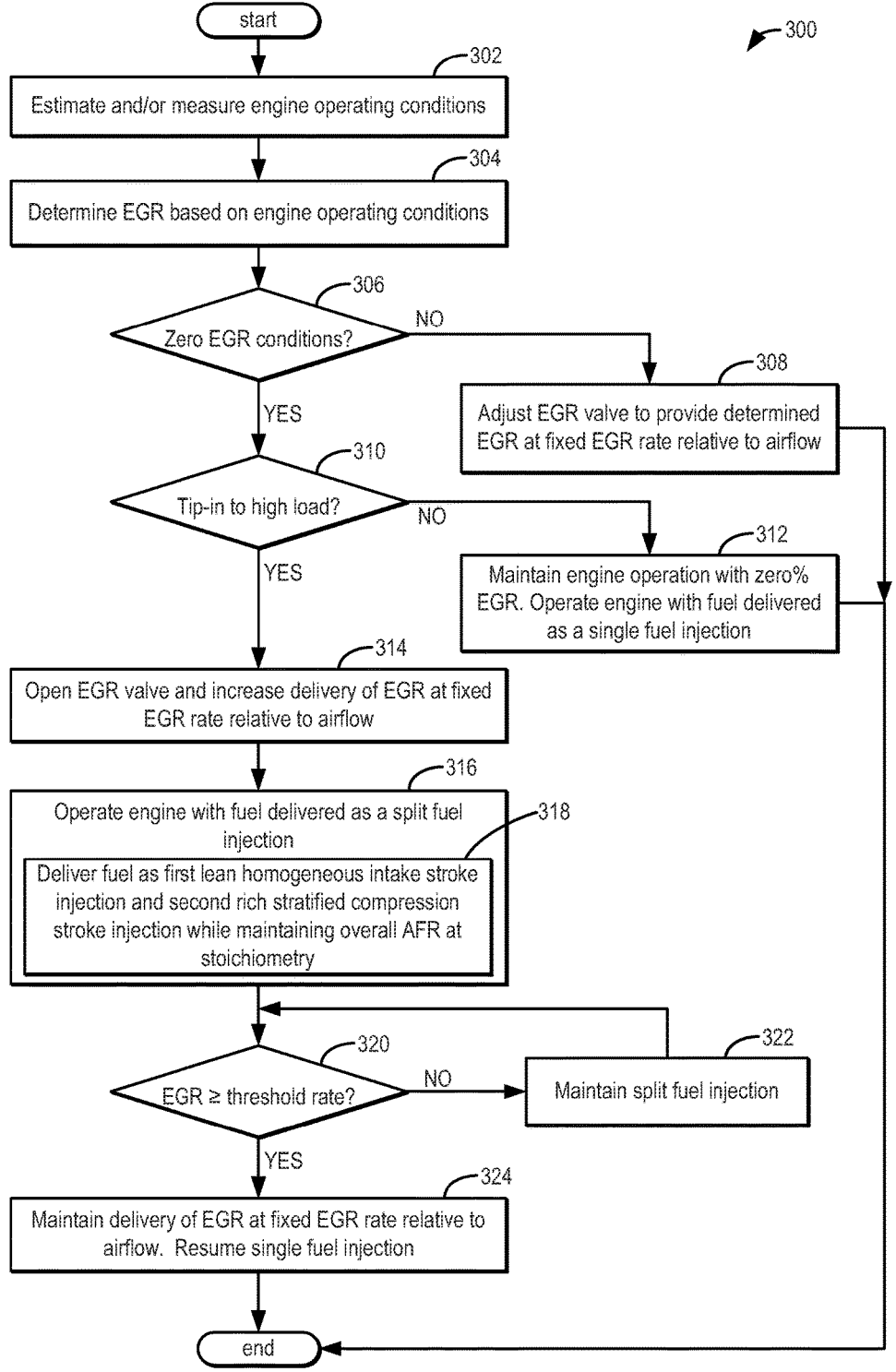
FIG. 3 shows a flow chart depicting an example method for using split fuel injection for increased knock tolerance when ramping in LP-EGR from a 0% EGR condition.
Figure 4:
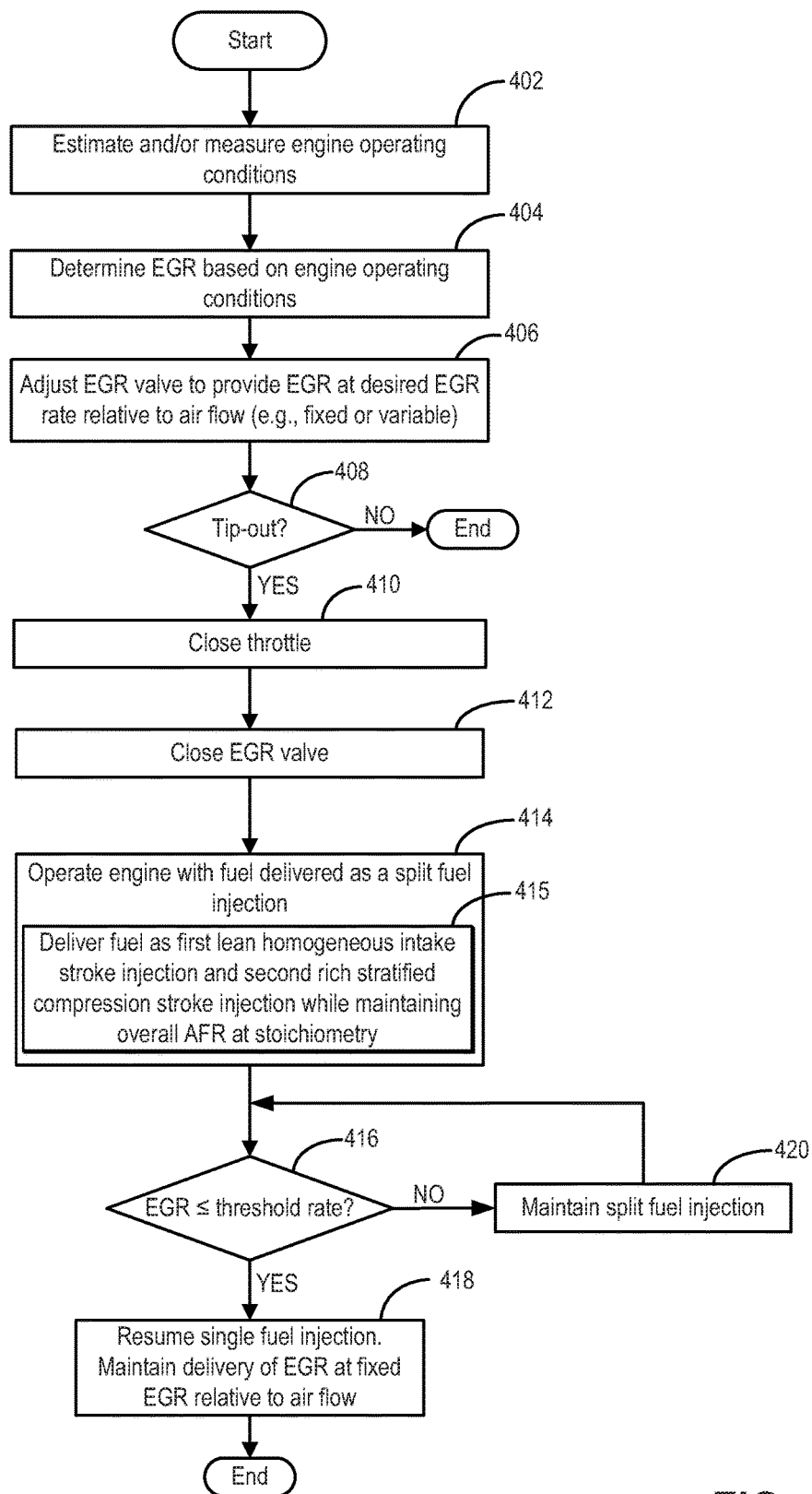
FIG. 4 shows a flow chart depicting an example method for using split fuel injection for increased dilution tolerance when ramping out LP-EGR from a fixed rate EGR mode.

FIGS. 3-4 depicts example embodiments of the routine of FIG. 2 specific for a maneuver that transitions the engine in and out of a zero EGR condition. In particular, the embodiments of FIGS. 3-4 pertain to an engine system where the low pressure EGR system is operated in a fixed rate EGR mode at all engine loads from medium load down to minimum load, and operated in a variable rate EGR mode at all engine loads above medium load. It will be appreciated that the examples of FIGS. 3-4 represent a special, non-limiting case and that the same split fuel injection may be similarly used in other vehicle maneuvers that involve transitioning the EGR rate and where EGR delivery or purging delays can lead to knock or combustion stability issues.

Now turning to FIG. 3, example routine 300 shows one example of how a split fuel injection is used during a tip-in maneuver in an engine configured to operate with fixed rate LP-EGR at all engine loads from medium load down to minimum load. for adjusting fuel injection in response to a tip-in while operating an engine with no LP-EGR is described. By transiently shifting to a split fuel injection until sufficient charging of the air intake system with EGR is achieved during a tip-in, knock tolerance of the engine at high engine load is improved. In addition, use of spark retard or fuel enrichment for mitigating the knock is delayed, improving engine fuel economy.

At 302, as at 202, engine operating conditions may be estimated and/or measured. These may include engine speed-load condition in addition to torque demand, BP, boost, MAP, engine temperature, etc. At 304, based on the estimated conditions, an EGR rate is determined. This may include at least determining an amount and/or rate of LP-EGR required based on the estimated conditions. In addition, an amount and/or rate of HP-EGR required or available may also be determined.

At 306, it may be determined if zero EGR conditions are present. As elaborated with reference to FIG. 2, during selected engine load conditions, such as at minimum load conditions, or when the engine speed is below a threshold, such as at idle speed, air flow to the engine may be at a minimum or reduced level. Since LP-EGR is provided at a fixed rate relative to airflow at those conditions, LP-EGR may be proportionately reduced to zero EGR levels. In addition, during those conditions, EGR may not be required since there is no benefit of EGR over dilution provided from variable valve timing.

If zero EGR conditions are not confirmed, then at 208, the routine adjusts the EGR valve based on the operating conditions to provide the desired EGR rate. This may include adjusting the EGR valve based on airflow to provide EGR at a fixed rate relative to airflow when the engine speed-load condition is in the fixed LP-EGR mode range. Alternatively, when the engine speed-load condition is in the variable LP-EGR mode range, the EGR valve may be adjusted to vary EGR based on speed-load conditions.

If zero EGR conditions are confirmed, the routine proceeds to 310 to confirm a tip-in to high load. If a tip-in to high load is not confirmed, then at 312, the routine includes maintaining engine operation with no EGR (0% EGR) and with fuel provided as a single (intake stroke) fuel injection. At 314, in response to the tip-in to higher load while operating the engine with no EGR, the routine includes increasing EGR. Increasing EGR includes ramping open the LP-EGR valve to increase delivery of LP-EGR at a fixed EGR rate relative to airflow as engine load increases. As used herein, increasing EGR includes increasing low pressure EGR. That is, an opening of the LP-EGR valve may be increased to increase recirculation of cooled exhaust residuals from an exhaust manifold, downstream of an exhaust turbine, to an intake manifold, upstream of an intake compressor.

At 316, the routine further includes, in response to the tip-in, fueling the engine with split fuel injection per cycle while maintaining combustion air-fuel ratio around stoichiometry. Specifically, at 318, the split fuel injection per cycle includes at least a first intake stroke injection and a second compression stroke injection. A timing of the first intake stroke injection may be adjusted to be a lean homogeneous intake stroke injection while a timing of the second compression stroke injection may be adjusted to be a rich stratified compression stroke injection. However, the total amount of fuel delivered as a split injection may be adjusted based on air flow to maintain an overall cylinder combustion air-fuel ratio around stoichiometry. In addition, while fueling the engine with split fuel injection per cycle, ignition timing may be maintained at a timing equal to that to be scheduled when the target EGR rate is delivered. An example split fuel injection, including split ratio and timing of each injection relative to piston position in the cylinder is depicted at FIG. 5 at fuel injection profile 530. As elaborated therein, a larger portion (e.g., 80-85%) of the total fuel injection may be delivered as a first lean homogeneous intake stroke injection, during an intake stroke before a time of spark. A smaller remaining portion (e.g., 15-20%) of the total fuel injection may then be delivered as a second rich stratified compression stroke injection, during the compression stroke, at or immediately before the time of spark. Such a split not only maintains the overall air-fuel ratio stoichiometric, but also maintains optimum after-treatment efficiency of an exhaust emission control device, such as of an exhaust TWC. This strategy also ensures that the combustion efficiency of the split injection strategy is not significantly different than a single intake injection strategy.

At 320, it may be determined if LP-EGR has ramped in and a threshold (or desired) rate of LP-EGR has been reached. If not, the use of split fuel injection per engine cycle may be maintained at 322. That is, the split fueling of the engine cylinders may be continued until a threshold rate of LP-EGR is reached. The threshold rate of LP-EGR may be based on the tip-in. For example, the threshold rate may be based on the higher load requested at the tip-in and may correspond to an amount of EGR (or engine dilution) required at the higher load condition to mitigate knock and pre-ignition issues.

If the threshold LP-EGR rate has been achieved, then at 324, the routine includes resuming fueling the engine with single fuel injection per cycle. Thus, once the air intake system has been sufficiently charged with LP-EGR, fuel injection as a single intake stroke injection may be resumed. In addition, the LP-EGR valve may be adjusted based on the airflow to maintain delivery of LP-EGR at a fixed EGR rate relative to airflow, as was being provided before the tip-in.

In this way, a split fuel injection with a first homogeneous lean intake stroke injection is used until sufficient EGR can be provided to mitigate knock. By using a subsequent stratified rich compression stroke injection, the extra fuel in the second injection can make up for the excess air dilution (from the first injection) needed to control knock. As such this approach also provides an emissions advantage over the alternative of running rich to control knock. Specifically, CO emissions can be lowered. The approach also synergistically addresses pre-ignition in addition to knock, improving vehicle drive cycle fuel efficiency. Further still, the approach delays the need for spark retard to address the knock, thereby improving engine fuel efficiency.

Turning to FIG. 4, it shows a routine 400 for performing split fuel injection during very low load operating conditions (at minimum load, or at idle engine speed, for example) until a desired LP-EGR amount is reached at the intake manifold. In particular, routine 400 may be performed during tip-out operations, when engine operation changes from operating with a fixed EGR rate schedule in a high/medium load operating region to a very low load operating region, until excess LP-EGR is purged from the intake system, thereby improving combustion stability and EGR tolerance.

At 402, the controller may estimate and/or measure engine operating conditions. Engine operating conditions may include, for example, engine speed, load, mass air flow, manifold absolute pressure, manifold temperature, engine coolant temperature, barometric pressure, catalyst temperature, etc. Based on one or more determined engine operating conditions, at 404, a desired EGR rate and/or amount may be determined. For example, if it is determined that the engine is operating in high-load conditions, LP-EGR may be desired at a variable rate relative to air flow. In another example, if it is determined that the engine is operating in medium to very low load conditions, including minimum load conditions, LP-EGR may be desired at a fixed rate relative to air flow. In some examples, such as during minimum load conditions or engine idling conditions, no (0%) EGR may be desired.

Figure 9:
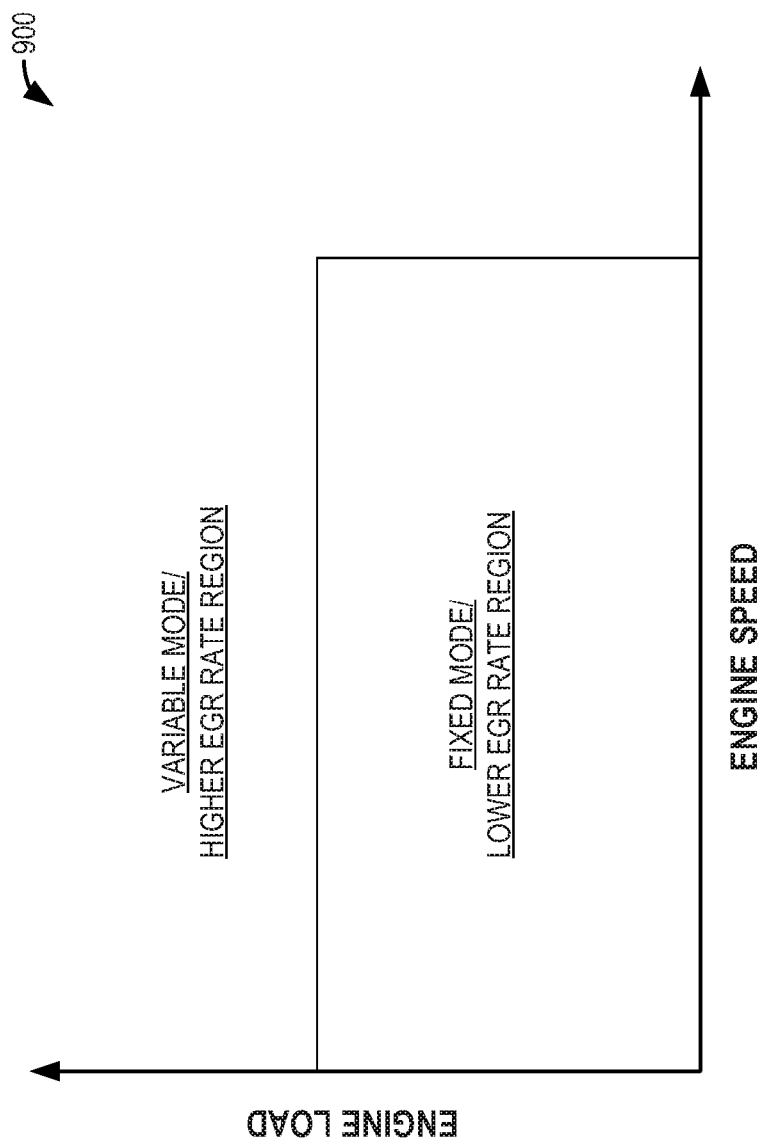
FIG. 9 shows an example map for selecting an LP-EGR mode of operation.

At 406, based on the desired EGR rate, an opening of the LP-EGR valve may be adjusted. This may include adjusting the EGR valve based on airflow to provide EGR at a fixed rate relative to airflow when the engine speed-load condition is in the fixed LP-EGR mode range (FIG. 9). By using a fixed EGR percentage during low to medium load conditions, transient control is improved. Alternatively, when the engine speed-load condition is in the variable LP-EGR mode (FIG. 9) range, the EGR valve may be adjusted to vary EGR based on speed-load conditions.

Next, at 408, it may be determined if a tip-out operation has occurred. For example, it may be determined if the operator has released the accelerator pedal. In one example, in response to the tip-out operation, engine load demanded may drop from the higher load demanded before the tip-in to a minimum load condition. In response to the tip-out, at 410, the controller may send signals to close the throttle and reduce intake airflow. As such, during the low load condition, the engine may be operating with a fixed EGR rate relative to the airflow. Thus, in response to the drop in intake airflow during the tip-out, the EGR rate may also be decreased, for example to a zero EGR condition at minimum engine load. Consequently, at 412, the controller may also close the LP-EGR valve.

If the tip-out operation is not confirmed, the controller may continue adjusting the EGR valve based on determined engine operating conditions to provide the desired EGR rate and the routine may end.

Upon closing the throttle and EGR valve, at 414, in response to the tip-out to lower load conditions, a split fuel injection may be performed. Specifically, in the LP-EGR circuit, due to long EGR loop transport delays, LP-EGR may continue to remain in the intake manifold even after closing the EGR valve. This may cause intake air-dilution by EGR in the intake to be higher than desired, leading to combustion instability. In order to improve combustion stability, a split injection may be performed until sufficient purging of the EGR has occurred, for example, until a rate of LP-EGR in the intake manifold is less than or equal to a threshold rate (e.g., at zero EGR).

At 415, the split fuel injection may be performed in at least two stages with a first engine fueling event occurring during the intake stroke and a second engine fueling event occurring during the compression stroke, while maintaining overall air-fuel ratio at stoichiometry. A timing and amount of the first intake stroke injection may be adjusted to provide a lean homogenous mixture. A remaining amount of the fuel may then be delivered in the compression stroke with a timing adjusted based on spark timing to provide a rich stratified combustion while the final burned gas is maintained stoichiometric. By maintaining an overall stoichiometric air-fuel ratio, combustion efficiencies during split injection that are not significantly different from the single intake injection strategy may be obtained.

As such, the split fuel injection ratio (that is, ratio of amount/percentage of fuel injected during the first injection to the amount/percentage of fuel injected during the second injection) may be adjusted such that the amount of fuel injected during the first intake stroke injection is greater than the amount of fuel injected during the second compression stroke injection. In one example, the split fuel injection ratio may be adjusted such that a minimum fuel mass is delivered during the compression stroke. This may include, for example, a split ratio of 95% intake stroke injection to 5% compression stroke injection. In another example, less than 5% of fuel may be injected during the second compression stroke fuel injection.

Further, a timing of the first intake stroke injection may be adjusted to be a lean homogeneous intake stroke injection while a timing of the second compression stroke injection may be adjusted to be a rich stratified compression stroke injection. However, the total amount of fuel injected may be adjusted based on air flow to maintain overall air-fuel ratio at stoichiometry. In addition, while fueling the engine with split fuel injection per cycle, ignition timing may be maintained at a timing equal to that to be scheduled when the target EGR rate is delivered.

An example split fuel injection, including split ratio and timing of each injection relative to piston position in the cylinder is depicted at FIG. 5 at fuel injection profile 525. As elaborated therein, a larger portion (e.g., 90%) of the total fuel injection may be delivered as a first lean homogeneous intake stroke injection, during an intake stroke before a time of spark. A smaller remaining portion (e.g., 10%) of the total fuel injection may then be delivered as a second rich stratified compression stroke injection, during the compression stroke, at or immediately before the time of spark.

Herein, the rich stratified compression stroke mixture around the spark plug improves (e.g., speeds up) the early burn time (e.g., by providing 0-10% mass fraction burn, or 0-10 NIFB) which improves the light load combustion stability when operating with high levels of dilution since overall burn times for these conditions typically tend to be very long. The very long burn times for highly dilute mixtures would typically require very early spark timings for optimum combustion phasing, which has a compounding adverse effect on combustion stability since in addition to degraded stability due to just the longer overall burn, the in-cylinder pressure and temperature conditions at time of ignition are degraded compared with later spark timings. Herein, the rich stratified mixture from the split injection shortens the early 0-10 MFB time, allowing later spark timings and improved combustion stability. The use of a split injection also maintains optimum after-treatment efficiency of an exhaust emission control device, such as of an exhaust TWC.

Returning to FIG. 4, at 416, it may be determined if LP-EGR has been sufficiently purged from the intake manifold such that LP-EGR is at or below a threshold rate. The threshold rate of LP-EGR may be based on the tip-out. In one example, where the tip-out is to minimum load conditions, it may be determined if the EGR has purged to zero % EGR. If yes, the routine may terminate split fuel injection and resume single fuel injection. Specifically, the controller may resume a single intake stroke fuel injection. During the single fuel injection LP-EGR may be delivered at a fixed rate relative to air flow. This may include maintaining the LP-EGR at the zero EGR condition until engine load increases above minimum load or until engine speed increases above idling speed. If LP-EGR has not been sufficiently purged to the threshold level, at 420, split fuel injection may be maintained until the desired LP-EGR rate is reached.

In this way, a split fuel injection strategy may be used until EGR is purged from the intake system to improve combustion stability at low load conditions. By delivering a larger portion of the fuel during an intake stroke and a remaining portion of the fuel during a compression stroke, a rich mixture may be generated around the spark plug, allowing for the use of later spark timings, as well as reducing a burn time in the cylinder. The shorter burn time increases combustion stability at the low load, high dilution condition. Use of a split injection may also improve exhaust emissions by promoting more complete combustion of very dilute mixtures.

Now turning to FIG. 5, map 500 depicts example split fuel injection timings that may be used to improve engine knock tolerance when ramping in fixed rate LP-EGR from no EGR conditions as well as split fuel injection timings that may be used to improve combustion stability when ramping out fixed rate LP-EGR to or towards low EGR conditions. Map 500 depicts exhaust valve timing at plot 502, intake valve timing at plot 504, piston position at plot 508, an example fuel injection profile used during a tip-out from fixed LP-EGR percentage at 525 (including fuel injection bars 510-512 relative to spark event 514) and an example fuel injection profile used during a tip-in from no EGR at 530 (including fuel injection bars 516-518 relative to spark event 520).

During engine operation, each cylinder within the engine typically undergoes a four stroke cycle: the cycle includes the intake stroke, compression stroke, power (or expansion) stroke, and exhaust stroke. During the intake stroke, generally, the exhaust valve closes (plot 502, dashed line) and intake valve opens (plot 504, solid line). Air is introduced into the cylinder via the intake manifold, and the cylinder piston moves to the bottom of the cylinder so as to increase the volume within the combustion chamber (plot 508). The position at which the piston is near the bottom of the cylinder and at the end of its stroke (e.g. when the combustion chamber is at its largest volume) is typically referred to by those of skill in the art as bottom dead center (BDC). During the compression stroke, the intake valve and exhaust valve are closed. The piston moves toward the cylinder head so as to compress the air within the cylinder. The point at which the piston is at the end of its stroke and closest to the cylinder head (e.g. when the combustion chamber is at its smallest volume) is typically referred to by those of skill in the art as top dead center (TDC).

In a process hereinafter referred to as injection, fuel is introduced into the combustion chamber. In a process hereinafter referred to as ignition or spark, the injected fuel is ignited by known ignition means such as a spark plug, resulting in combustion. During the expansion stroke, the expanding gases push the piston back to BDC. A crankshaft coupled to the piston converts piston movement into a rotational torque of the rotary shaft. Finally, during the exhaust stroke, the exhaust valve opens to release the combusted air-fuel mixture to the exhaust manifold and the piston returns to TDC.

Note that the above is shown merely as an example, and that intake and exhaust valve opening and/or closing timings may vary, such as to provide positive or negative valve overlap, late intake valve closing, or various other examples.

As such, on direct injection engines, such as the engine of FIG. 1, it is possible to divide the fuel injections into multiple pulses that can be timed at any point in the 720 crank angle degrees (CAD) engine cycle. The fuel injection during the high load engine operation is typically during the intake stroke between TDC and BDC of intake where the vaporization of fuel in the cylinder cools the air-fuel mixture resulting in a reduced tendency for engine knock. The typical fuel injection strategy produces a combustible air-fuel mixture at time of spark that is nearly homogeneous with respect to fuel, air, internal burned gas residuals, and EGR.

To reduce knocking tendency during tip-in conditions while operating with less EGR than desired, a split injection according to fuel injection profile 530 can be used while delaying the need to retard spark. Tip-in fuel injection profile 530 includes a first intake stroke injection 516 (solid bar) and a second compression stroke injection 518 (hatched bar). The split ratio of the split fuel injection may be adjusted so that most (approximately 80-85%) of the fuel is injected during the intake stroke to provide a charge cooling benefit. The remaining 15-20% of the fuel is injected during the compression stroke so that the overall air-fuel ratio is maintained stoichiometric. This split ratio enables an optimum three-way catalyst (TWC) after-treatment efficiency to be maintained.

Split injection can also be used to improve combustion stability at very light loads with EGR, such as during a tip-out condition while operating with a fixed rate of LP-EGR relative to air flow present in the combustion chamber, as shown at fuel injection profile 525. Tip-out fuel injection profile 525 includes a first intake stroke injection 510 (solid bar) and a second compression stroke injection 512 (hatched bar). The split ratio of the split fuel injection may be adjusted so that most (approximately 95%) of the fuel is injected during the intake stroke. The remaining 5% of the fuel is injected during the compression stroke so that the overall air-fuel ratio is maintained stoichiometric.

A timing of the second injection 512 is adjusted to be coincident with or slightly shifted before or after spark event 514 so as to create a rich air-fuel mixture around the spark plug. This results in a lean homogeneous intake stroke injection and a rich stratified compression stroke injection. Specifically, the initial intake stroke injection may be performed at 420 CAD while the remaining fuel is added during the compression stroke at 680 CAD. In one example, the intake stroke injection timing may remain the same as the corresponding single injection timing and may likely not vary from tip-out to tip-out. The injection timings may also be different between tip-ins and tip-outs.

Herein, the rich stratified compression stroke mixture around the spark plug would improve (e.g., speed up) the early burn time (e.g., by providing 0-10% mass fraction burn, or 0-10 MFB) which improves the light load combustion stability when operating with high levels of dilution since overall burn times for these conditions typically tend to be very long. The very long burn times for highly dilute mixtures would typically require very early spark timings for optimum combustion phasing, which has a compounding adverse effect on combustion stability since in addition to degraded stability due to just the longer overall burn, the in-cylinder pressure and temperature conditions at time of ignition are degraded compared with later spark timings. Herein, the rich stratified mixture from the split injection shortens the early 0-10 MFB time, allowing later spark timings and improved combustion stability.

As such, in tip-out fuel injection profile 525, the second compression stroke injection may need to be kept at a minimum feasible fuel mass that can be delivered by the fuel injector. This is because a similar strategy employing near equal split ratios (e.g., 50% intake injection and 50% compression injection) would not improve combustion stability due to decreased combustion efficiency and degraded 10%-90% MFB times as the flame front propagates into the lean mixture, compared to a single injection strategy with stoichiometric combustion. The degraded 10-90 MFB times for a 50/50 strategy would offset any improvement in the 0-10 MFB due to the compression injection. Therefore, a preferred split ratio for fuel injection profile 525 includes 10% (or less) of the fuel injected as the second compression stroke injection and 90% (or more) of the fuel injected as the first intake stroke injection.

Now turning to FIG. 6, map 600 depicts an example fuel injection adjustment in response to a tip-in to high load from low EGR rate conditions to higher EGR rate conditions. Map 600 depicts change in operator pedal position (PP) at plot 602, LP-EGR flow is shown at plot 604, fuel injection is shown at plot 608, and overall combustion air-fuel ratio (AFR) is shown at plot 610.

Prior to t1, the engine may be operating with EGR delivered at a lower rate. In one example, the lower rate may be a fixed rate relative to airflow. Specifically, as pedal position changes (plot 602) prior to t1, an LP-EGR valve opening may be correspondingly adjusted to provide the target EGR flow. In addition, a fuel injection amount (plot 608) may also be adjusted so as to maintain combustion air-fuel ratio (AFR) around stoichiometry (plot 610). As such, prior to t1, fuel may be delivered as a single intake stroke injection, as depicted by the solid bars. As such, prior to t1, the engine may be operating in regimes that are not knock limited.

At t1, while in operating at the lower EGR rate, a transient maneuver to a high load condition may occur. In the depicted example, the transition to a high load condition may be in response to an operator tip-in to high load and/or high speed. In response to the high load condition, a higher EGR rate may be requested substantially immediately. In response to the rapidly increasing engine load, an LP-EGR valve opening may be increased to increase delivery of LP-EGR to provide the target increased engine dilution required at the higher load. However, there may be a transport delay in delivering the EGR to the intake system. Specifically, the desired dilution (EGR) may be higher, as shown by dotted segment 605. Due to transport delays, the actual delivery of the dilution may be slower, as shown by plot 604, causing the engine to temporarily become knock limited at t1. Thus, between t1 and t2, while the delivery of LP-EGR is ramped up to provide the target higher EGR rate, there may be less dilution available than is required, rendering the engine prone to knock and/or pre-ignition.

To improve the engine knock tolerance at the high load condition where LP-EGR is being ramped in, fuel may be delivered between t1 and t2 as a split fuel injection. Specifically, the split fuel injection may include at least a first intake stroke injection wherein a larger portion of the fuel is delivered (solid bar) and a second compression stroke injection wherein a smaller, remaining portion of the fuel is delivered (hatched bar). As such, the total amount of fuel delivered may be the same as a corresponding single fuel injection. That is, no overall enleanment or enrichment may be performed to address the knock likelihood. In addition, spark timing may also be maintained. That is, no spark retard may be immediately required to address the knock likelihood. Also, a timing of the intake stroke injection and compression stroke injection may be adjusted relative to a cylinder spark event to provide a lean homogeneous intake stroke injection and a rich stratified compression stroke injection. As elaborated at FIG. 5 (e.g., at tip-in fuel injection profile 530), the intake stroke injection may be performed before spark and may be delivered as a homogeneous lean injection to provide charge cooling benefits. The compression stroke injection may then be performed at or after spark and may be delivered as a stratified rich injection so as to maintain an overall combustion air-fuel ratio at or around stoichiometry while also maintaining exhaust catalyst after-treatment efficiency.

At t2, the delivered LP-EGR flow may be sufficiently high and at or around the target LP-EGR rate. In other words, the desired dilution is available. Thus, at t2, single intake stroke fuel injection may be resumed. After t2, as before t1, LP-EGR flow may be adjusted based on pedal position to meet the demanded torque while maintaining single fuel injection.

In this way, split fuel injection is used to improve knock tolerance during a tip-in to high load when operating with lower EGR and while transitioning to a higher rate of EGR.

In one example, during a first mode, an engine may be operated with a fixed EGR rate relative to airflow, and in response to a tip-in to higher load, single fuel injection per cycle may be maintained. Herein, the transport delay in providing the higher EGR may be lower since at least some EGR is already available. In comparison, during a second mode, the engine may be operated with no low pressure EGR, and in response to a tip-in to higher load, the engine may be operated with split fuel injection per cycle, while also increasing LP-EGR. Herein, the transport delay in providing the higher EGR may be higher since no EGR is already available.

Further, during the first mode, in response to the tip-in, LP-EGR may be increased while maintaining the operating of the engine with the given fixed EGR rate. As such, during both the first and second modes, a combustion air-fuel ratio may be maintained at or around stoichiometry. Also during both the first and second modes, ignition timing may be maintained at a nominal timing (such as at MBT or retarded from MBT). As used herein, operating with split fuel injection per cycle includes delivering fuel as a first lean homogeneous intake stroke injection and a second rich stratified compression stroke injection.

In another example, a vehicle engine system comprises a turbocharger, a low pressure exhaust gas recirculation (LP-EGR) system including a LP-EGR valve and a control system comprising a computer readable storage medium. The control system or controller is configured with computer readable instructions for controlling operation of the LP-EGR valve to maintain no EGR at all engine loads within a first, lower load range; and in response to a tip-in to a second, higher load range, increasing an opening of the LP-EGR valve and delivering fuel as a split injection per cycle until a threshold EGR rate is achieved. The control system may include further instructions for, after the threshold EGR rate is achieved, delivering fuel as a single injection per cycle and controlling operation of the LP-EGR valve to maintain a fixed EGR percentage rate of fresh airflow through the LP-EGR system at all engine loads within the second load range. Delivering fuel as a single injection per cycle includes delivering fuel as a single intake stroke injection and wherein delivering fuel as a split injection per cycle includes delivering fuel as a first intake stroke injection and a second compression stroke injection. Further, when delivering fuel as a split injection per cycle, a first larger portion of the fuel is delivered in the first intake stroke injection and a second, remaining portion of the fuel is delivered in the second compression stroke injection. The vehicle system may further comprise a high pressure exhaust gas recirculation (LP-EGR) system including a HP-EGR valve, wherein during each of the first and second load ranges, an opening of the HP-EGR valve is adjusted based on the opening of the LP-EGR valve.

Turning to FIG. 7, map 700 shows an example fuel injection adjustment in response to a tip-out to lower load while operating an engine with EGR provided at a higher EGR rate. Specifically, change in operator accelerator pedal position is shown at plot 702, LP-EGR flow is shown at plot 704, fuel injection is shown at plot 708, and overall air-fuel combustion ratio is shown at plot 712.

Prior to t1, the engine may be operated with EGR delivered at a higher rate. In one example, the higher rate may be fixed rate of EGR relative to air flow. As the pedal position changes (plot 702), a torque demand may vary and a controller may adjust a position of an LP-EGR valve so that the LP-EGR flow may be changed to meet the desired dilution as the torque demand changes (plot 704). In one example, LP-EGR may be provided at a fixed rate relative to total air flow. In addition, a fuel injection amount (plot 708) may be adjusted so as to maintain combustion air-fuel ratio (AFR) around stoichiometry (plot 712). As such, prior to t1, fuel may be delivered as a single intake stroke injection, as depicted by the solid bars.

At t1, a transient operation to minimum engine load conditions or idle engine conditions may occur. In the example depicted, transition to minimum load may occur due to a vehicle operator tip-out at t1. Consequently, after t1, pedal position may change to a fully released position (plot 702), and an intake throttle may be closed to decrease air flow in response to the released accelerator pedal. In response to the rapidly decreasing engine load, a target EGR rate may drop to a lower rate and an opening of the LP-EGR valve may be decreased to reduce the delivered EGR. In particular, an immediate drop in LP-EGR flow may be desired LP-EGR, as depicted at dotted segment 703. However, due to long transport delays, the LP-EGR flow may not change to the desired LP-EGR flow as fast as the change in airflow occurs. In other words, EGR may purge from the air intake system slower than desired. Consequently, due to excess EGR present in the system, a highly dilute air-fuel mixture may enter the cylinder and may render the engine combustion stability limited. To improve combustion stability of highly dilute air-fuel mixtures at the prevalent very low load conditions, a transient shift to delivering fuel as a split fuel injection may be performed (plot 708). Specifically, between t1 and t2, fuel may be delivered as a first intake stroke injection wherein a larger amount of fuel is delivered (shown as solid bars), and a second compression stroke injection wherein a remaining amount of fuel is delivered (shown as hatched bars). As such, a total amount of fuel delivered during split injection may be the same as a corresponding single fuel injection amount.

A timing of injection may be adjusted relative to cylinder spark such that the first fuel injection is delivered as a lean homogenous intake stroke injection and the second injection is delivered as a rich stratified compression stroke injection. As described at FIG. 5 (e.g., at fuel tip-out injection profile 525), the intake stroke injection may be performed before the spark and fuel may be delivered as a lean homogenous injection. Subsequently, the compression stroke may be adjusted to coincide with slightly shifted before or after spark timing and may be delivered as a rich stratified injection to maintain overall combustion air-fuel ratio at or near stoichiometry (plot 712) while also maintaining exhaust catalyst after-treatment efficiency.

At t2, LP-EGR may decrease to within a threshold of the target EGR rate (plot 704) that is dependent on the engine load conditions at the tip-out. Therefore, at t2, when the desired EGR dilution is achieved and the combustion stability of the engine is improved, single intake stroke fuel injection may be resumed (plot 708). After t2, as before t1, LP-EGR flow may be adjusted based on pedal position to meet the demanded torque while maintaining single fuel injection. In this way, split-fuel injection may be used to improve dilution tolerance and combustion stability, and reduce chances of cylinder misfire during tip-out transients until EGR is sufficiently purged from the intake system.

In one example, a vehicle engine system comprises a turbocharger, a low pressure exhaust gas recirculation (LP-EGR) system including a LP-EGR valve, and a control system comprising a computer readable storage medium and configured to control operation of the LP-EGR valve to maintain fixed EGR percentage of fresh air flow at all engine loads within a first, higher load range. Further, in response to a tip-out to a second, lower load range, decreasing an opening of the LP-EGR valve and delivering fuel as a split injection per cycle until a threshold EGR rate is achieved. The control system includes further instructions for, after the threshold EGR rate is achieved, delivering fuel as a single injection per cycle and controlling operation of the LP-EGR valve to maintain a fixed EGR percentage rate of fresh airflow through the LP-EGR system at all engine loads within the second load range. Delivering fuel as a single injection per cycle includes delivering fuel as a single intake stroke injection and delivering fuel as a split injection per cycle includes delivering fuel as a first lean homogeneous intake stroke injection and a second rich stratified compression stroke injection.

Now turning to FIG. 8, map 800 depicts an example fuel injection adjustment in response to a tip-in to high load from no EGR conditions when operating an engine with a flat EGR schedule, as well as in response to a tip-out to low load condition when operating with the flat EGR schedule. Map 800 depicts change in operator pedal position (PP) at plot 802, LP-EGR flow is shown at plot 804, total engine air flow is shown at plot 806, fuel injection is shown at plot 808, EGR % is shown at plot 810, and overall combustion air-fuel ratio (AFR) is shown at plot 812.

Prior to t1, the engine may be operating with EGR delivered at a fixed rate relative to airflow. Specifically, as pedal position changes (plot 802), a throttle position may be adjusted to vary a total air flow to the engine (plot 806). At the same time, a position of an LP-EGR valve is correspondingly adjusted so that the LP-EGR flow (plot 804) is also adjusted. As such, this enables a constant EGR percentage to be maintained (plot 810). In addition, a fuel injection amount (plot 808) may also be adjusted so as to maintain combustion air-fuel ratio (AFR) around stoichiometry (plot 812). As such, prior to t1, fuel may be delivered as a single intake stroke injection, as depicted by the solid bars.

At t1, while operating in the fixed EGR mode, an operator pedal tip-out to a lower load may occur. The tip-out may cause the engine load to be immediately decreased. In response to the tip-out, a throttle opening may be decreased (e.g., the throttle may be closed) resulting in a drop in engine air flow. In addition, the LP-EGR valve may be closed to bring LP-EGR doing by a proportional amount, for example, to a zero EGR condition. This is because the reduced engine load may not need any engine dilution. While an immediate drop in LP-EGR is desired, as shown at dashed line 803, due to the long LP-EGR loop, and the resulting transport delay, purging of LP-EGR from the air intake system may take longer, with LP-EGR actually decaying between t1 and t2 at a slower rate depicted at solid line 804. This slow purging of engine dilution at the low load conditions can degrade combustion stability.

Therefore, to improve the combustion stability, between t1 and t2, while the LP-EGR is purged at the low load conditions, fuel injection may be transiently shift from the single intake stroke injection to a split fuel injection. Specifically, the split fuel injection may include at least a first intake stroke injection wherein a larger portion of the fuel is delivered (solid bar) and a second compression stroke injection wherein a smaller, remaining portion of the fuel is delivered (hatched bar). As such, the total amount of fuel delivered may be the same as a corresponding single fuel injection. That is, no overall enleanment or enrichment may be performed to address the knock likelihood. In addition, spark timing may also be maintained. Also, a timing of the intake stroke injection and compression stroke injection may be adjusted relative to a cylinder spark event to provide a lean homogeneous intake stroke injection and a rich stratified compression stroke injection, as previously discussed at FIG. 5 (at tip-out fuel injection profile 525), and the example of FIG. 6.

At t2, sufficient LP-EGR purging may be confirmed. For example, LP-EGR may be below a threshold. Thus, at t2, single intake stroke fuel injection is resumed. In addition, LP-EGR is maintained at the no EGR level due to the engine remaining at minimum load conditions until t3.

At t3, while in the zero EGR condition, an operator tip-in to a high load condition may occur. In response to the tip-in, throttle opening may be increased with a corresponding increase in engine airflow. An LP-EGR valve opening may also be correspondingly increased to increase delivery of LP-EGR to provide the increased engine dilution required at the higher load. As such, a higher LP-EGR may be desired immediately, as shown by dotted segment 805. However, due to transport delays in delivering the EGR to the intake system, the actual delivery of the EGR may be slower, as shown by solid line 804. Thus, between t3 and t4, while the delivery of LP-EGR is ramped up to provide EGR at a fixed rate relative to the airflow, there may be less dilution available than is required, rendering the engine prone to knock and/or pre-ignition.

To improve the engine knock tolerance at the high load condition where LP-EGR is being ramped in from no EGR conditions, fuel may be delivered between t3 and t4 as a split fuel injection. Specifically, the split fuel injection may include at least a first intake stroke injection wherein a larger portion of the fuel is delivered (solid bar) and a second compression stroke injection wherein a smaller, remaining portion of the fuel is delivered (hatched bar). As such, the total amount of fuel delivered may be the same as a corresponding single fuel injection. That is, no overall enleanment or enrichment may be performed to address the knock likelihood. In addition, spark timing may also be maintained. That is, no spark retard may be immediately required to address the knock likelihood. Also, a timing of the intake stroke injection and compression stroke injection may be adjusted relative to a cylinder spark event to provide a lean homogeneous intake stroke injection and a rich stratified compression stroke injection, as elaborated previously at FIG. 5 (at tip-in fuel injection profile 530), and the example of FIG. 6.

At t4, the LP-EGR flow may be sufficiently high and the LP-EGR rate may be at a threshold rate that is a fixed percentage of the total airflow. Therefore at t4, single intake stroke fuel injection may be resumed and the engine may return to operating with LP-EGR provided as per the fixed LP-EGR mode.

In this way, split fuel injection is used to improve knock tolerance in response to a tip-in to high load when operating with no EGR and while transitioning to a fixed rate LP-EGR, as well as to improve combustion stability in response to a tip-out to low load while operating with the fixed LP-EGR rate.

In one example, a controller may transiently shift engine operation from single fuel injection to split fuel injection in response to each of a tip-in to high load from engine operation with no EGR and a tip-out to low load from engine operation with EGR at a fixed rate relative to airflow. Responsive to the tip-in, LP-EGR may be increased by opening an LP-EGR valve, while responsive to the tip-out, LP-EGR is decreased by closing the LP-EGR valve. During the tip-in, single fuel injection is resumed after EGR reaches a first threshold rate, and thereafter EGR is maintained at the fixed rate relative to airflow. The first threshold rate may be based on the tip-in to high load. During the tip-out, single fuel injection is resumed after EGR reaches a second threshold rate (lower than the first threshold rate), and thereafter EGR is maintained at the fixed rate relative to airflow. The second threshold rate may be based on the tip-out to low load.

The split fuel injection responsive to each of the tip-in and the tip-out may include a first intake stroke injection and a second compression stroke injection. A split ratio of the split fuel injection responsive to the tip-in may be based on a cylinder combustion stability limit while a split ratio of the split fuel injection responsive to the tip-out is based on a cylinder knock limit. For example, a split ratio of the split fuel injection responsive to the tip-in may include a higher compression injection amount than the split ratio of the split fuel injection responsive to the tip-out.

Now turning to FIG. 10, map 1000 depicts an example fuel injection adjustment in response to engine maneuvers that transition an engine in and out of knock limited regimes. Map 1000 depicts the desired EGR at plot 1002 (solid line) relative to the delivered EGR at plot 1004 (dashed line), an indication of whether the engine is operating in a knock-limited regime is provided at plot 1006, and usage of single or split fuel injection is indicated at plot 1008.

Prior to t1, the engine is operating with a lower EGR rate. At t1, due to increasing engine load, the desired EGR rate increases (plot 1002). Due to transport delays, the delivered EGR trails behind and is not available until sometime after t1 (plot 1004). During this period, fuel is injected to the engine as a single fuel injection. As such, the maneuver at t1 with increasing engine load and delayed EGR delivery may not push the engine into a knock limited regime (plot 1006). Therefore, single fuel injection is maintained.

Between t2 and t3, due to a change in engine operating conditions, the engine may transiently move into a knock-limited operating region. However, due to the delivered EGR being at or around (e.g., within a threshold of) the target EGR rate, use of split fuel injection is not required and single fuel injection is maintained. After t3, and until t4, due to a change in engine operating conditions, the engine may transiently move out of the knock-limited operating region.

At t4, due to decreasing engine load, the desired EGR rate decreases. Due to transport delays, the delivered EGR trails behind and is not sufficiently purged until sometime after t4. As such, the maneuver at t4 with decreasing engine load and delayed EGR purging may not push the engine into a knock limited regime. Therefore, single fuel injection is maintained.

Between t4 and t5, due to a change in engine operating conditions, the engine may transiently move into a knock-limited operating region. At t5, while in the knock-limited operating region, due to increasing engine load, the desired EGR rate increases while the delivered EGR trails behind and is not available until sometime after t5. Due to the maneuver at t5 with increasing engine load and delayed EGR delivery causing the engine to operate in the knock limited regime, fuel injection is transitioned from single fuel injection to split fuel injection. In particular, split fuel injection is used until the delivered EGR rate is within a threshold of the target EGR rate, at t6. Then, once sufficient dilution is available, single fuel injection may be resumed.

In this way, a split fuel injection strategy may be transiently used during engine maneuvers that transition the engine into knock-limited or combustion stability limited regions. By using a split fuel injection during increasing engine load (e.g., a tip-in from low EGR conditions) to compensate for the transport delay of charging an air intake system with EGR, the knock tolerance of the engine is improved. Likewise, by using a split fuel injection during decreasing engine load (e.g., a tip-out from high EGR conditions) to compensate for the transport delay in purging EGR from the air intake system, the dilution tolerance of the engine is improved. By performing a first lean homogeneous intake stroke injection of fuel during a tip-in, substantial cylinder charge cooling benefits can be achieved. By then using a rich stratified compression stroke injection of fuel around the time of a spark event, a combustion air-fuel ratio can be maintained at stoichiometry while improving exhaust catalyst after-treatment efficiency. The split fuel injection thereby improves the knock tolerance of the engine at the high load conditions when the desired engine dilution is being slowly ramped in. The improved knock tolerance also delays the need for spark retard or enrichment for knock or pre-ignition mitigation, improving engine fuel economy. By performing a split injection of fuel during the tip-out, spark timing can be delayed while the rich mixture around the spark plug reduces cylinder burn time. As such, this improves the in-cylinder pressure and temperature conditions at time of ignition, improving combustion stability and engine EGR tolerance.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
transiently shifting from single fuel injection to split fuel injection in response to each of a tip-in to high load from engine operation with lower EGR and a tip-out to low load from engine operation with higher EGR.

2. The method of claim 1, further comprising, responsive to the tip-in, increasing LP-EGR by opening an LP-EGR valve, and responsive to the tip-out, decreasing LP-EGR by closing the LP-EGR valve.

3. The method of claim 1, further comprising, during the tip-in, resuming single fuel injection after EGR reaches a first threshold rate based on the tip-in to high load, and during the tip-out, resuming single fuel injection after EGR reaches a second threshold rate based on the tip-out to low load.

4. The method of claim 1, wherein the split fuel injection responsive to each of the tip-in and the tip-out includes a first intake stroke injection and a second compression stroke injection.

5. The method of claim 4, wherein a split ratio of the split fuel injection responsive to the tip-out is based on a cylinder combustion stability limit and wherein a split ratio of the split fuel injection responsive to the tip-in is based on a cylinder knock limit.

6. The method of claim 1, wherein engine operation with lower EGR includes engine operation with a fixed rate of EGR relative to airflow and wherein engine operation with higher EGR includes engine operation with a variable rate of EGR relative to intake airflow.

7. The method of claim 1, wherein engine operation with lower EGR includes engine operation with no EGR and wherein engine operation with higher EGR includes engine operation with a fixed rate of EGR relative to intake airflow.

* * * * *